(12) United States Patent
Miyake et al.

(10) Patent No.: US 10,566,865 B2
(45) Date of Patent: Feb. 18, 2020

(54) MOTOR

(71) Applicant: Nidec Corporation, Kyoto (JP)

(72) Inventors: Takuo Miyake, Kyoto (JP); Kazuhiro Sato, Kyoto (JP); Katsuya Takahashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/192,073

(22) Filed: Nov. 15, 2018

(65) Prior Publication Data

US 2019/0214868 A1 Jul. 11, 2019

(30) Foreign Application Priority Data

Jan. 10, 2018 (JP) .................. 2018-002068

(51) Int. Cl.
| | | |
|---|---|---|
| *H02K 1/27* | (2006.01) | |
| *G11B 19/20* | (2006.01) | |
| *H02K 21/24* | (2006.01) | |
| *G11B 25/04* | (2006.01) | |
| *H02K 15/03* | (2006.01) | |
| *H02K 1/30* | (2006.01) | |
| *H02K 3/34* | (2006.01) | |
| *H02K 5/167* | (2006.01) | |

(52) U.S. Cl.
CPC ....... *H02K 1/2786* (2013.01); *G11B 19/2045* (2013.01); *H02K 21/24* (2013.01); *G11B 25/043* (2013.01); *H02K 1/30* (2013.01); *H02K 3/345* (2013.01); *H02K 5/1675* (2013.01); *H02K 15/03* (2013.01); *H02K 2205/03* (2013.01)

(58) Field of Classification Search
CPC ........ H02K 1/27; H02K 21/24; H02K 1/2786; H02K 2205/03; H02K 3/345; H02K 5/1675; H02K 1/30; H02K 15/03; G11B 19/20; G11B 19/2045; G11B 25/043
USPC ....................................... 310/67 R
See application file for complete search history.

(56) References Cited

U.S. PATENT DOCUMENTS

| | | |
|---|---|---|
| 8,094,410 B2 | 1/2012 | Shirai et al. |
| 8,223,455 B2 | 7/2012 | Iguchi et al. |
| 8,760,799 B2 | 6/2014 | Iguchi et al. |
| 9,065,315 B1 | 6/2015 | Ochitani et al. |
| 9,698,637 B2 | 7/2017 | Ochitani et al. |
| 2007/0211375 A1* | 9/2007 | Iguchi ............... G11B 17/0282 360/99.08 |
| 2017/0353068 A1* | 12/2017 | Miyake ............. G11B 19/2045 |

FOREIGN PATENT DOCUMENTS

| | | |
|---|---|---|
| JP | 2000-023413 A | 1/2000 |
| JP | 2002-272037 A | 9/2002 |

* cited by examiner

*Primary Examiner* — Naishadh N Desai
(74) *Attorney, Agent, or Firm* — Keating & Bennett

(57) ABSTRACT

A protrusion includes a leading end to which a yoke is fixed and a connector that connects an axially lower end of a flange and the leading end. A minimum width of the connector in a direction intersecting a direction in which the protrusion protrudes is smaller than a maximum width of the leading end in a radial direction. A radial position at a radially inner end of the leading end is located radially outward with respect to a side surface in a radially inward direction of a magnet.

5 Claims, 1 Drawing Sheet

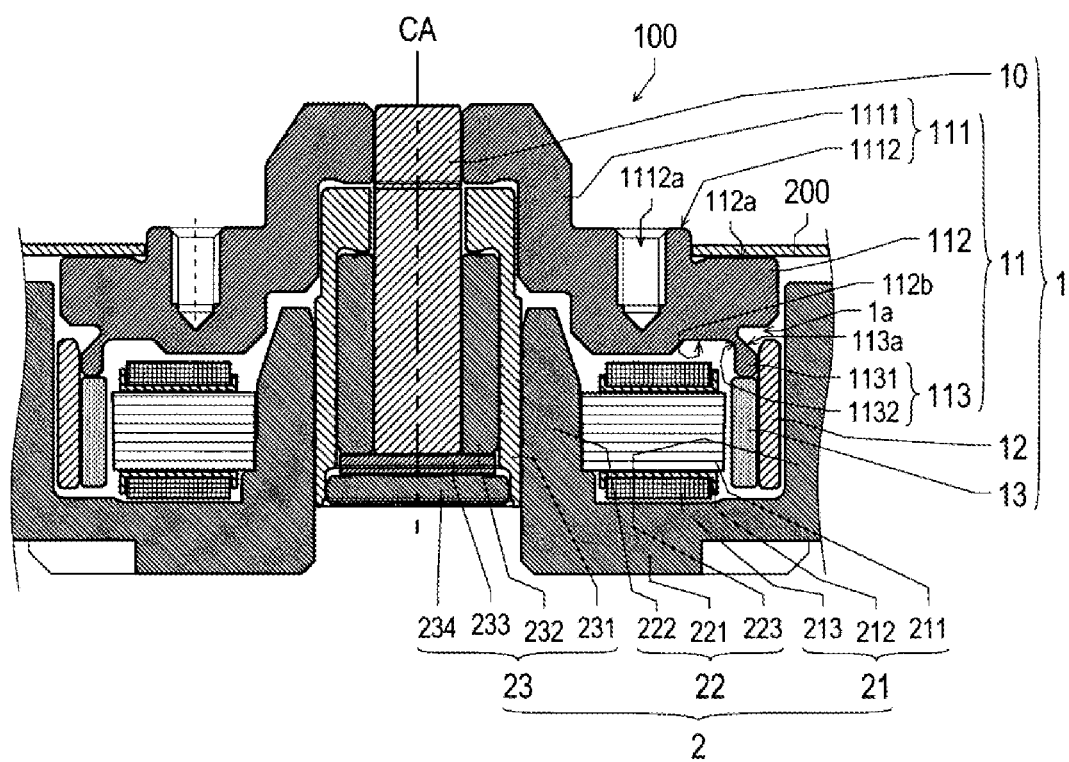

MOTOR

CROSS REFERENCE TO RELATED APPLICATIONS

This application claims the benefit of priority to Japanese Patent Application No. 2018-002068 filed on Jan. 10, 2018. The entire contents of this application are hereby incorporated herein by reference.

BACKGROUND OF THE INVENTION

1. Field of the Invention

The present disclosure relates to a motor.

2. Description of the Related Art

A disc recording device includes a motor that rotates a recording medium such as an optical disc. For example, a conventional motor includes a spindle motor that rotates a recording disc placed on a disc placing unit. A rotor hub of the spindle motor includes a disc placing unit on which the recording disc is placed and an annular protrusion in which an annular yoke fixing a magnet is press-fitted. The disc placing unit includes a disc receiving surface abutting on the recording disc and a non-contact surface formed on an inner circumferential side of the disc receiving surface. The annular protrusion is provided below the disc placing unit in an axial direction.

When the yoke is press-fitted, sometimes the disc placing unit is deformed to degrade flatness of the disc receiving surface. Although the degradation of the flatness can be corrected by precision cutting of the rotor hub, a contaminant such as dust and fine debris during the machining adheres when the rotor hub is machined while the yoke is provided. In the conventional motor, in order to avoid a problem caused by the contamination, the deformation of the disc placing unit due to the press fitting of the yoke is prevented by setting an outer diameter of the annular protrusion smaller than an outer diameter of the non-contact surface.

However, the conventional motor does not have a way to prevent the deformation caused by the press fitting of the yoke other than the above configuration. Thus, in a motor that does not having the above configuration, it is necessary to suppress or prevent the deformation caused by the press fitting of the yoke by another configuration.

SUMMARY OF THE INVENTION

According to an exemplary embodiment of the present disclosure, a motor includes a rotor that is rotatable about a center axis and a stator that drives the rotor. The rotor includes a magnet radially opposed to the stator, a cylindrical yoke to which the magnet is fixed, and a rotor hub that holds the yoke. The rotor hub includes a cylindrical rotor base, a flange on which an annular plate is able to be placed on a surface oriented toward one side in an axial direction, and a protrusion protruding from an end on the other side in the axial direction of the flange toward the other side in the axial direction. The flange is located radially outward with respect to the rotor base, extends in a circumferential direction, and is located on one side in the axial direction with respect to the stator. The protrusion includes a leading end to which the yoke is fixed, and a connector that connects the end on the other side in the axial direction of the flange and the leading end. A minimum width of the connection unit in a direction intersecting a direction in which the protrusion protrudes is smaller than a maximum width of the leading end in the radial direction. A radial position at an end in a radially inward direction of the leading end is located radially outward with respect to a side surface in the radially inward direction of the magnet.

The above and other elements, features, steps, characteristics and advantages of the present disclosure will become more apparent from the following detailed description of the preferred embodiments with reference to the attached drawings.

BRIEF DESCRIPTION OF THE DRAWINGS

FIG. 1 is a sectional view illustrating a configuration example of a motor.

DETAILED DESCRIPTION OF THE PREFERRED EMBODIMENTS

Hereinafter, an exemplary embodiment of the present disclosure will be described with reference to the drawing.

In the specification, a direction parallel to a center axis CA is referred to as an "axial direction" in a motor 100. In the axial direction, a direction from a stator 21 of a stationary unit 2 (to be described later) toward a rotor hub 11 of a rotor 1 (to be described later) is referred to as "axially upward" as one side in the axial direction, and a direction from the rotor hub 11 toward the stator 21 is referred to as "axially downward" as the other side in the axial direction. In each component, an axially upward end is referred to as an "axially upper end", and an axially downward end is referred to as an "axially lower end". In each component, an axially upward portion is referred to as an "axially upper portion", and an axially downward portion is referred to as an "axially lower portion". On a surface of each component, the surface oriented axially upward is referred to as an "axially upper surface" and the surface oriented axially downward is referred to as an "axially lower surface".

A direction orthogonal to the center axis CA is referred to as a "radial direction", and a rotation direction of the rotor 1 around the center axis CA is referred to as a "circumferential direction". In the radial direction, a direction toward the center axis CA is referred to as "radially inward" as one side in the radial direction, and a direction away from the center axis CA is referred to as "radially outward" as the other side in the radial direction. In each component, a radially inward end is referred to as a "radially inner end", and a radially outward end is referred to as a "radially outer end". On a side surface of each component, the side surface oriented radially inward is referred to as a "radially inside surface", and the side surface oriented radially outward is referred to as a "radially outside surface".

Names of the direction, the end, and the surface do not express a positional relationship and a direction in the case that the motor 100 is incorporated in an actual device.

For example, the motor 100 of the embodiment is mounted on a disc recording device, and drives and rotates an annular plate member 200 for recording. The annular plate member 200 is an optical disc such as a DVD (Digital Versatile Disc) and a BD (Blu-ray Disc; registered trademark). FIG. 1 is a sectional view illustrating a configuration example of the motor 100. FIG. 1 illustrates a sectional structure in the case that the motor 100 is virtually cut on a plane including the center axis CA.

The motor 100 is an outer rotor type. The motor 100 includes the rotor 1 and the stationary unit 2.

The rotor 1 is rotatable around the center axis CA extending in a vertical direction. As illustrated in FIG. 1, the rotor 1 includes a shaft 10, the rotor hub 11, a yoke 12, and a magnet 13.

The shaft 10 extends along the center axis CA. The axially lower portion of the shaft 10 is accommodated in a bearing mechanism 23 (to be described later). The axially upper portion of the shaft 10 protrudes axially upward from the axially upper end of the bearing mechanism 23. The rotor hub 11 is fixed to the axially upper portion of the shaft 10. The shaft 10 is a rotation axis of the motor 100. The shaft 10 is rotatable around the center axis CA extending in the vertical direction. The shaft 10 is not limited to this example, but the shaft 10 may be fixed to the stationary unit 2. That is, the shaft 10 may be a fixed shaft. In the case that the shaft 10 is the fixed shaft, a bearing (not illustrated) is provided between the shaft 10 and the rotor hub 11.

The rotor hub 11 is attached to the axially upper end of the shaft 10. The rotor hub 11 holds the yoke 12. The rotor hub 11 has a rotor base 111, a flange 112, and a protrusion 113. The rotor base 111 has a cylindrical shape centered on the center axis CA, and is fixed to the shaft 10. The flange 112 is provided at the radially outer end of the rotor base 111, extends in the circumferential direction, and is located axially upward with respect to the stator 21 of the stationary unit 2. The annular plate member 200 can be placed on an axially upper surface 112a of the flange 112. The protrusion 113 protrudes axially downward from the axially lower end of the flange 112. A configuration of the protrusion 113 will be described later.

More specifically, the rotor base 111 includes a tubular unit 1111 and a fitting unit 1112. The tubular unit 1111 has a tubular shape centering on the center axis CA. The shaft 10 is axially inserted in the tubular unit 1111. In particular, the shaft 10 and the bearing mechanism 23 are inserted in the axially lower portion of the tubular unit 1111. The axially upper portion of the tubular unit 1111 is attached to the axially upper portion of the shaft 10. The fitting unit 1112 is provided at the radially outer end in the axially lower portion of the tubular unit 1111, and extends in the circumferential direction. The flange 112 is provided on the radially outside surface of the fitting unit 1112. In other words, the flange 112 protrudes radially outward from the radially outside surface of the fitting unit 1112.

When the annular plate member 200 is placed on the axially upper surface 112a of the flange 112, the axially upper end of the fitting unit 1112 is fitted in the radially inner end of the annular plate member 200. More specifically, axially upward with respect to the flange 112, the radially inside surface of the annular plate member 200 contacts with the radially outside surface of the fitting unit 1112.

A clamping hole 1112a recessed axially downward is provided on the axially upper surface of the fitting unit 1112. When the annular plate member 200 is placed on the axially upper surface 112a of the flange 112, a clamp member (not shown) holds the annular plate member 200 between the clamp member and the axially upper surface 112a of the flange 112. At this point, a part of the clamp member is fitted in the clamp hole 1112a.

The yoke 12 has a cylindrical shape centering on the center axis CA. In the embodiment, the yoke 12 extends axially along the center axis CA. Axially downward with respect to the flange 112, the yoke 12 is disposed radially outward with respect to the protrusion 113, and is attached to the protrusion 113. More specifically, axially downward with respect to the flange 112, the axially upper end of the yoke 12 is fixed to the radially outside surface at a leading end of the protrusion 113. The yoke 12 is fixed by at least press fitting. In addition to the press fitting, the yoke 12 may be fixed by another method. For example, the press-fitted yoke 12 may further be fixed to the radially outside surface at the leading end of the protrusion 113 using a bonding agent.

The magnet 13 includes magnetic poles, which are different from each other and are alternately arranged in the circumferential direction, and is disposed radially outward with respect to the stator 21 of the stationary unit 2. The magnet 13 is radially opposed to the stator 21. The magnet 13 is fixed to the yoke 12.

The stationary unit 2 rotatably supports the rotor 1. As illustrated in FIG. 1, the stationary unit 2 includes a stator 21, a bracket 22, and the bearing mechanism 23.

The stator 21 drives and rotates the rotor 1 when the motor 100 is driven. The stator 21 is disposed radially inward with respect to the magnet 13 of the rotor 1. The stator 21 is fixed to the bracket 22 radially inward, and opposed to the magnet 13 radially outward with a gap in the radial direction.

As illustrated in FIG. 1, the stator 21 includes a stator core 211, an insulator 212, and a coil 213. For example, the stator core 211 is a core member constructed with a laminated steel plate in which a plurality of electromagnetic steel plates are laminated. The stator core 211 may have an annular shape centering on the center axis CA. Alternatively, a plurality of split cores (not illustrated) constituting the stator core 211 may be connected in the circumferential direction with the center axis as the center. The radially inner end of the stator core 211 is fixed to the bracket 22. The radially outer end of the stator core 211 is opposed to the magnet 13 of the rotor 1 with a gap in the radial direction. For example, the insulator 22 is an insulating member made of a resin material, and covers at least a part of the stator core 21. The coil 23 is constructed with a conducting wire wound around the stator core 21 with the insulator 22 interposed therebetween.

As illustrated in FIG. 1, the bracket 22 includes a plate 221, an inner peripheral wall 222, and an outer peripheral wall 223. The plate 221 has a plate shape having an opening in a central portion through which the center axis CA passes, and is located axially downward with respect to the rotor 1, the stator 21, and the bearing mechanism 23. The inner peripheral wall 222 protrudes axially upward from the radially inner end of the plate 221, and extends in the circumferential direction. The shaft 10 and the bearing mechanism 23 are inserted in the inner peripheral wall 222. The stator 21 is fixed to the radially outside surface of the inner peripheral wall 222. In the embodiment, the stator core 211 is fixed to the radially outside surface of the inner peripheral wall 222. The outer peripheral wall 223 protrudes axially upward from the radially outer end of the plate 221, and extends in the circumferential direction. The yoke 12 to which the magnet 13 is fixed and the stator 21 are accommodated in a space surrounded by the plate 221, the inner peripheral wall 222, and the outer peripheral wall 223.

The bearing mechanism 23 rotatably supports the shaft 10 by utilizing a fluid dynamic pressure caused by a working fluid such as lubricating oil. As illustrated in FIG. 1, the bearing mechanism 23 includes a bearing holder 231, a sleeve bearing 232, a thrust plate 233, and a cap 234.

The bearing holder 231 has a tubular shape extending axially with the center axis CA as the center, and is inserted and fixed inside the inner peripheral wall 222 of the bracket 22. The axially lower portion of the shaft 10, the bearing holder 231, the sleeve bearing 232, the thrust plate 233, and the cap 234 are disposed in the bearing holder 231. The axially upper end of the bearing holder 211 is radially opposed to the shaft 10 with the working fluid interposed therebetween. The sleeve bearing 232 has a tubular shape extending axially. The shaft 10 is inserted in the bearing holder 231 and the sleeve bearing 232. The thrust plate 233 has a plate shape extending perpendicularly to the axial direction. The thrust plate 233 is provided axially downward with respect to the shaft 10, and radially opposed to the axially lower end of the shaft 10 with the working fluid interposed therebetween. Consequently, the shaft 10 can be prevented from moving axially downward with respect to the thrust plate 233. The cap 234 is fitted in the axially lower end of the bearing holder 231, and closes and covers the axially lower end.

The inside of the bearing holder 231 is filled with the working fluid such as a lubricating oil. More specifically, gaps of the axially lower end of the shaft 10, the bearing holder 231, the sleeve bearing 232, the thrust plate 233, and the cap 234 are filled with the working fluid. The bearing holder 231 rotatably supports the shaft 10 with the working fluid and the bearing 232 interposed therebetween. Thanks to lubricating action of the working fluid, the shaft 10 can slide smoothly on the axially upper end of the bearing holder 231, the sleeve bearing 232, and the thrust plate 233.

The configuration of the protrusion 113 will be described below. As illustrated in FIG. 1, the protrusion 113 includes a leading end 1131 and a connection unit 1132. The yoke 12 is fixed to the leading end 1131. The connection unit 1132 connects the axially lower end of the flange 112 and the leading end 1131. In other words, one end of the connection unit 1132 is connected to the leading end 1131. The other end of the connection unit 1132 is connected to the axially lower end of the flange 112.

A minimum width of the connection unit 1132 in a direction intersecting a direction in which the protrusion 113 protrudes is smaller than a maximum width of the leading end 1131 in the radial direction. That is, the protrusion 113 is constricted at the connection unit 1132 in the direction intersecting the direction in which the protrusion 113 protrudes. According to this configuration, the connection unit 1132 of the protrusion 113 is easily elastically deformed. For this reason, when the yoke 12 is press-fitted in the protrusion 113, stress acting on the rotor hub 11 due to the press fitting of the yoke 12 is relaxed by the elastic deformation of the connection unit 1132 of the protrusion 113. More specifically, in the case that the rotor hub 11 does not include the protrusion 113, sometimes the rotor hub 11 is deformed by the stress to radially incline a direction normal to the axially upper surface 112a of the flange 112 when the rotor hub 11 is fitted in the yoke 12. The deformation of the flange 112 becomes problematic when the annular plate member 200 such as an optical disk is placed on the axially upper surface 112a of the flange 112. On the other hand, according to this configuration, the deformations of the rotor base 111 and the flange 112 can be suppressed when the yoke 12 is held by the rotor hub 11, and generation of the problem associated with the deformations can be suppressed or prevented.

A radial position at the radially inner end of the leading end 1131 is located radially outward with respect to the radially inside surface of the magnet 13. According to this configuration, the radially inner end of the protrusion 113 hardly hits the stator 21. Thus, an accommodation space of the stator 21 can be secured in the motor 100.

In the embodiment, an axial position at the axially lower end of the leading end 1131 is located axially upward with respect to the axially upper end of the stator 21. According to this configuration, the axial length of the magnet 13 can be set relatively longer. Consequently, necessity of use of the magnet 13 having high magnetic performance is eliminated, so that cost of the motor 100 can be reduced.

However, the axial position at the axially lower end of the leading end 1131 is not limited to the embodiment, but may be located axially downward with respect to the axially upper end of the stator 21. According to this configuration, the axial length of the protrusion 113 can be set relatively longer. Thus, the stress at time of holding the yoke 12 on the rotor hub 11 can more easily be relaxed by the elastic deformation of the protrusion 113. Thus, the deformation of the flange 112 on which the annular plate member 200 can be placed can further be suppressed. Alternatively, the axial position at the axially lower end of the leading end 1131 may be located at the same position as the axial position at the axially upper end of the stator 21.

When viewed from the circumferential direction, a recess 1a is provided between the flange 112 and the protrusion 113 as illustrated in FIG. 1. The recessed 1a is recessed radially inward, and extends in the circumferential direction. In other words, the rotor 1 further includes the recess 1a. The recess 1a is recessed radially inward from the radially outer end of the rotor hub 11 with respect to the radially inner end of the yoke 12. The recess 1a is provided axially downward with respect to the flange 112, and overlaps the connection unit 1132 when viewed from the radial direction. The connection unit 1132 of the protrusion 113 can be provided without increasing a radial size of the rotor hub 11 by providing the recess 1a at the radially outer end of the rotor hub 11 axially downward with respect to the flange 112.

Radially inward with respect to the yoke 12, a gap is axially provided between the flange 112 and the protrusion 113 by the recessed portion 1a. The axially upper end of the yoke 12 is axially opposed to the axially lower surface of the flange 112 with a gap. Thus, a space where the protrusion 113 can be deformed can be secured axially downward with respect to the flange 112. Thus, for example, when the yoke 12 is held by the rotor hub 11, the yoke 12 is easily deformed in order to relax the stress acting on the rotor hub 11 due to the press fitting of the yoke 12.

As illustrated in FIG. 1 when viewed from the circumferential direction, the recess 1a is constructed with the axially lower surface of the flange 112 and an inclined surface 113a of the protrusion 113. The inclined surface 113a is a surface that goes axially downward as it goes radially outward, and is a part of the radially outside surface of the protrusion 113. In other words, the radially outside surface of the protrusion 113 may not include the inclined surface 113a, but preferably includes the inclined surface 113a that goes axially downward as it goes radially outward. However, this example does not exclude a configuration in which the radially outside surface of the protrusion 113 does not include the inclined surface 113a. The inclined surface 113a faces the recess 1a.

According to this configuration, the connection unit 1132 can be thinned by the inclined surface 113a facing the recess 1a, and a space where the connection unit 1132 can axially be displaced can be provided between the inclined surface 113a and the flange 112. More specifically, for example, in the case that the protrusion 113 does not include the inclined surface 113 facing the recess 1a but includes the axially upper surface that extends radially and is axially opposed to the flange 112, the connection unit 1132 becomes wider in the direction including at least the axial direction. For this reason, the connection unit 1132 is hardly bent in the axial direction. Additionally, a gap between the flange 112 and the above axially upper surface is hardly secured, so that the protrusion 113 is hardly displaced in the axial direction. On the other hand, in the configuration of the embodiment, the connection unit 1132 is easily bent in the axial direction, and the protrusion 113 is easily displaced in the axial direction as compared with the above temporary configuration including the axially upper surface in which the protrusion 113 extends radially. Thus, the stress acting on the rotor hub 11 due to the press fitting of the yoke 12 can more easily be relaxed by the elastic deformation of the connection unit 1132.

For example, the present disclosure is useful for the motor having the yoke that fixes the magnet.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
    a rotor rotatable about a center axis; and
    a stator that drives the rotor; wherein
    the rotor includes:
        a magnet radially opposed to the stator;
        a cylindrical yoke to which the magnet is fixed; and
        a rotor hub that holds the yoke;
    the rotor hub includes:
        a cylindrical rotor base;
        a flange on which an annular plate is able to be placed on a surface oriented toward one side in an axial direction; and
        a protrusion protruding from an end on the other side in the axial direction of the flange toward the other side in the axial direction;
    the flange is located radially outward with respect to the rotor base, extends in a circumferential direction, and is located on one side in the axial direction with respect to the stator;
    the protrusion includes:
        a leading end to which the yoke is fixed; and
        a connector that connects the end on the other side in the axial direction of the flange and the leading end;
        a minimum width of the connector in a direction intersecting a direction in which the protrusion protrudes is smaller than a maximum width of the leading end in the radial direction; and
        a radial position at an end in a radially inward direction of the leading end is located radially outward with respect to a side surface in the radially inward direction of the magnet.

2. The motor according to claim 1, wherein an axial position at an end on the other side in the axial direction of the leading end is located on the other side in the axial direction with respect to an end on one side in the axial direction of the stator.

3. The motor according to claim 1, wherein an axial position at an end on the other side in the axial direction of the leading end is located on one side in the axial direction with respect to an end on one side in the axial direction of the stator.

4. The motor according to claim 1, wherein
    the rotor includes a recess that is recessed radially inward from an end in a radially outward direction of the rotor hub with respect to an end in a radially inward direction of the yoke; and
    the recess extends axially downward with respect to the flange, and overlaps the connector when viewed in the radial direction.

5. The motor according to claim 4, wherein
    a side surface in the radially outside of the protrusion includes an inclined surface that extends radially outward and toward the other side in the axial direction; and
    the inclined surface faces the recess.

* * * * *